(12) United States Patent
Steubing

(10) Patent No.: US 9,217,537 B2
(45) Date of Patent: Dec. 22, 2015

(54) MOBILE CAMERA POINT OF VIEW MOUNT

(71) Applicant: Matthew R. Steubing, Salt Lake City, UT (US)

(72) Inventor: Matthew R. Steubing, Salt Lake City, UT (US)

(*) Notice: Subject to any disclaimer, the term of this patent is extended or adjusted under 35 U.S.C. 154(b) by 83 days.

(21) Appl. No.: 13/895,533

(22) Filed: May 16, 2013

(65) Prior Publication Data

US 2014/0339382 A1    Nov. 20, 2014

(51) Int. Cl.
*F16M 13/04* (2006.01)
*F16M 11/10* (2006.01)
*F16M 11/20* (2006.01)
*F16M 11/40* (2006.01)
*F16M 13/00* (2006.01)

(52) U.S. Cl.
CPC .............. *F16M 13/04* (2013.01); *F16M 11/10* (2013.01); *F16M 11/2028* (2013.01); *F16M 11/40* (2013.01); *F16M 13/00* (2013.01); *Y10S 224/908* (2013.01)

(58) Field of Classification Search
USPC .......................... 224/201, 265, 270, 185, 908; 396/420–423; 352/243; 269/76; 248/176.1, 177.1, 519, 521, 534
See application file for complete search history.

(56) References Cited

U.S. PATENT DOCUMENTS

| | | | |
|---|---|---|---|
| 490,150 A | 1/1893 | Low | |
| 1,179,063 A | 4/1916 | Aldrete | |
| 2,636,822 A | 4/1953 | Anderson | |
| 2,827,732 A | 3/1958 | Shumaker | |
| 4,526,308 A * | 7/1985 | Dovey | 224/265 |
| 4,614,452 A | 9/1986 | Wang | |
| 4,949,928 A | 8/1990 | Hoshino | |
| D394,669 S * | 5/1998 | Becker et al. | D16/242 |
| 6,124,892 A | 9/2000 | Nakano | |
| 6,155,470 A | 12/2000 | Robison | |
| 6,695,270 B1 * | 2/2004 | Smed | 248/274.1 |
| 6,764,231 B1 * | 7/2004 | Shubert | 396/419 |
| 7,316,377 B2 * | 1/2008 | Smed | 248/276.1 |
| 7,677,517 B2 | 3/2010 | Suzuki | |
| 7,717,629 B2 | 5/2010 | Kenoyer et al. | |
| 8,057,112 B2 | 11/2011 | Amadril et al. | |
| 2004/0211799 A1 | 10/2004 | Loughman | |
| 2006/0268156 A1 | 11/2006 | Gale | |
| 2008/0173681 A1 * | 7/2008 | Robinson | 224/257 |
| 2010/0278523 A1 | 11/2010 | Brown | |
| 2012/0287336 A1 * | 11/2012 | Jensen | 348/376 |

(Continued)

FOREIGN PATENT DOCUMENTS

| | | |
|---|---|---|
| AU | 2004219160 B2 | 9/2004 |
| DE | 687771 | 2/1940 |
| DE | 20307052 U1 | 11/2003 |
| DE | 102009049381 A1 | 4/2011 |

(Continued)

OTHER PUBLICATIONS

PCT/US2014/037260, International Search Report and Written Opinion, Sep. 24, 2014.

*Primary Examiner* — Justin Larson
*Assistant Examiner* — Phillip Schmidt
(74) *Attorney, Agent, or Firm* — Kunzler Law Group

(57) ABSTRACT

For a mobile camera POV mount, a rotational stabilizer is in physical communication with the surface. The rotational stabilizer may have a length in the range of 15 to 40 centimeters. A rotator is disposed on the rotational stabilizer. The rotator holds a stalk such that the stalk may be rotated about at least one degree of freedom. The stalk includes a proximal end with a camera connector disposed on the proximal end.

17 Claims, 11 Drawing Sheets

(56) References Cited

U.S. PATENT DOCUMENTS

2012/0328279 A1    12/2012  Raizman
2013/0034347 A1     2/2013  Randy et al.
2014/0139679 A1*    5/2014  Orbassano .................... 348/157

FOREIGN PATENT DOCUMENTS

| GB | 784094 | 10/1957 |
| GB | 2481642 | 1/2012 |
| WO | 2013021345 A1 | 2/2013 |

* cited by examiner

MOBILE CAMERA POINT OF VIEW MOUNT

BACKGROUND

1. Field

The subject matter disclosed herein relates to a camera mount and more particularly relates to a mobile camera point of view (POV) mount.

2. Description of the Related Art

Video cameras are often used to record activity from the participants' point of view. However, it is often difficult to securely position video cameras at an advantageous perspective.

BRIEF SUMMARY

An apparatus, system, and method for a mobile camera POV mount are disclosed. The apparatus includes a rotational stabilizer, rotator, and the stalk. The rotational stabilizer is in physical communication with the surface. The rotational stabilizer may have a length in the range of 15 to 40 centimeters. The rotator is disposed on the rotational stabilizer. The rotator holds a stalk such that the stalk may be rotated about at least one degree of freedom. The stalk includes a proximal end. A camera connector is disposed on the proximal end of the stalk. A system and method also perform the functions of the apparatus.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. Descriptions of figures may refer to elements described in previous figures, like numbers referring to like elements.

Figure 1:
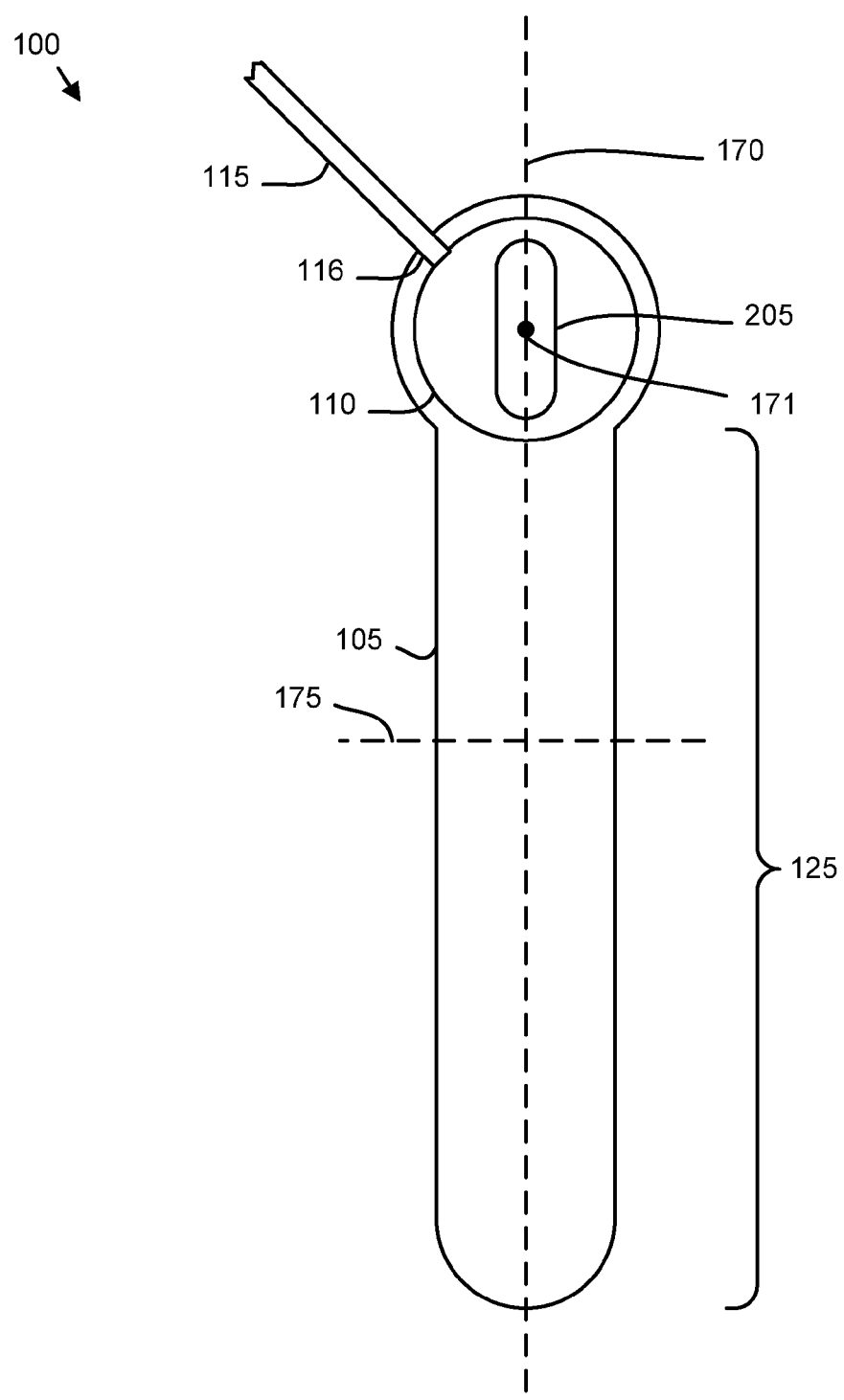
FIG. 1 is a front view drawing illustrating one embodiment of a mobile camera POV mount.

FIG. 1 is a front view drawing illustrating one embodiment of a mobile camera POV mount 100. In the past, mobile cameras have typically been mounted to user's head, such as by being mounted to a helmet, goggles, a headband, and the like. Unfortunately, mounting the camera on the head may result in frequent changes of perspective as the user moves her head from side to side and up and down.

Cameras have also been strapped to the chest of the user. Unfortunately, the perspective of the camera from the chest is frequently obscured by motions of the arms and hands. In addition, an eye level or higher perspective is often more advantageous for capturing the action of an activity. In addition, strapping a camera to the user's chest severely limits perspective options.

The mobile camera POV mount 100 described herein supports positioning a camera to capture the user's activity with a number of advantageous perspectives. The mobile camera POV mount 100 may be mounted to a user's back so that the perspective does not change rapidly as the user turns her head. In addition, the mobile camera POV mount 100 supports a variety of perspectives, including over the shoulder the user, behind the user, to the side of the user, and the like as will be described hereafter.

The mobile camera POV mount 100 includes a rotational stabilizer 105, a rotator 110, and a stalk 115. The rotator 110 may include a clamp 205. The rotational stabilizer 105 may be in physical communication with a surface. The surface may be a user, clothing, a backpack, recreational equipment, and the like. The recreational equipment may be a surfboard, a snowboard, a bicycle, and the like.

The rotational stabilizer 105 may have a longitudinal length 125 in the range of 15 to 40 centimeters (cm). In one embodiment, the longitudinal length in the range of 15 to 40 cm is along a first axis 170. The rotational stabilizer 105 may mitigate rotation about a second axis 175. For example, the rotational stabilizer 105 may be secured to a backpack. Alternatively, the rotational stabilizer 105 may be secured with straps to the user. The rotational stabilizer 105 may mitigate rotation of the mobile camera POV mount 100 about the second axis 175.

The rotational stabilizer 105 may be formed of a molded plastic. Alternatively, the rotational stabilizer 105 may be formed of rigid foam. In one embodiment, the rotational stabilizer 105 is formed of metal.

The rotator 110 may be disposed on the rotational stabilizer 105. In addition, the rotator 110 may hold the stalk 115 such that the stalk 115 may be rotated about at least one degree of freedom. In the depicted embodiment, the rotator 110 allows the stalk 115 to be rotated about a degree of freedom 171 normal to the drawing. The clamp 205 may prevent the stalk 115 from rotating about the at least one degree of freedom 171 in a locked position. In addition, the clamp 205 may allow the stalk 115 to rotate about the at least one degree of freedom 171 in an unlocked position.

The stalk 115 may include a distal end 116 held by the rotator 110. A camera connector may be disposed on proximal end (not shown) of the stalk 115. Alternatively, camera connectors may be disposed on both the proximal end and the distal end of the stalk 115 as will be shown hereafter.

Figure 2:
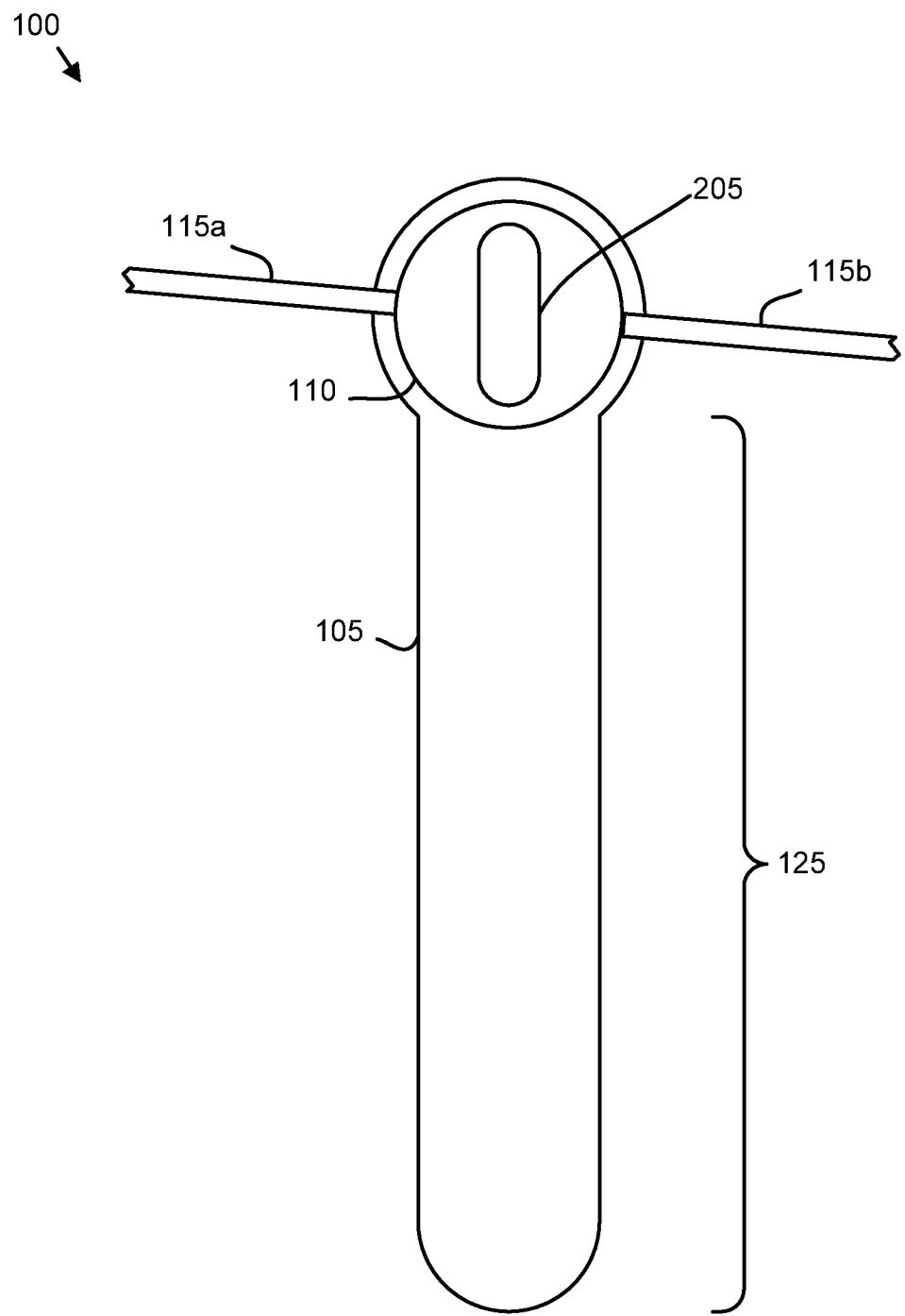
FIG. 2 is a front view drawing illustrating one alternate embodiment of a mobile camera POV mount.

FIG. 2 is a front view drawing illustrating one alternate embodiment of the mobile camera POV mount 100. In the depicted embodiment, the stalk 115 is held by the rotator 110 at a midpoint of the stalk 115. In an alternate embodiment, the first stalk 115a is held by the rotator 110 while a second stalk 115b is also held by the rotator 110.

Figure 3:
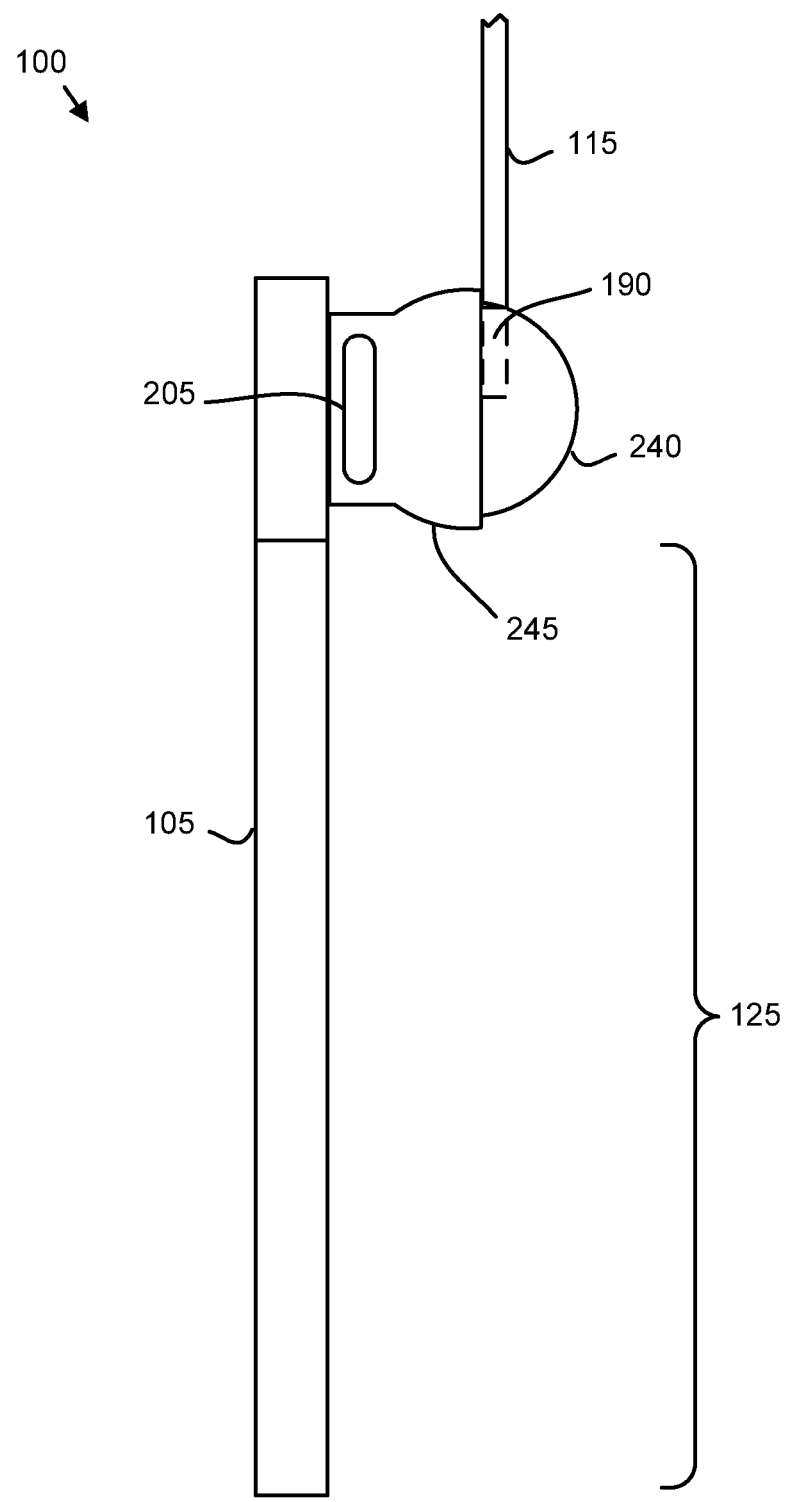
FIG. 3 is a side view drawing illustrating one alternate embodiment of a mobile camera POV mount.

FIG. 3 is a side view drawing illustrating one alternate embodiment of a mobile camera POV mount 100. In the depicted embodiment, the rotator 110 includes a socket 245, a ball 240, and the clamp 205. The ball 240 may rotate within the socket 245. In addition, the ball 240 may hold the stalk 115 within an orifice 190. The clamp 205 may apply force to the ball 240 in a locked position. The force may frictionally hold the ball 240 against the socket 245 in the locked position such that the ball 240 does not rotate within the socket 245 about the at least one degree of freedom 171.

In addition, the clamp 205 may be placed in an unlocked position. The clamp 205 may not apply the force to the ball 240 in the unlocked position. As a result, the ball 240 may freely rotate within the socket 245, allowing the stalk 115 to be positioned in a number of positions relative to the rotational stabilizer 105.

Figure 4:
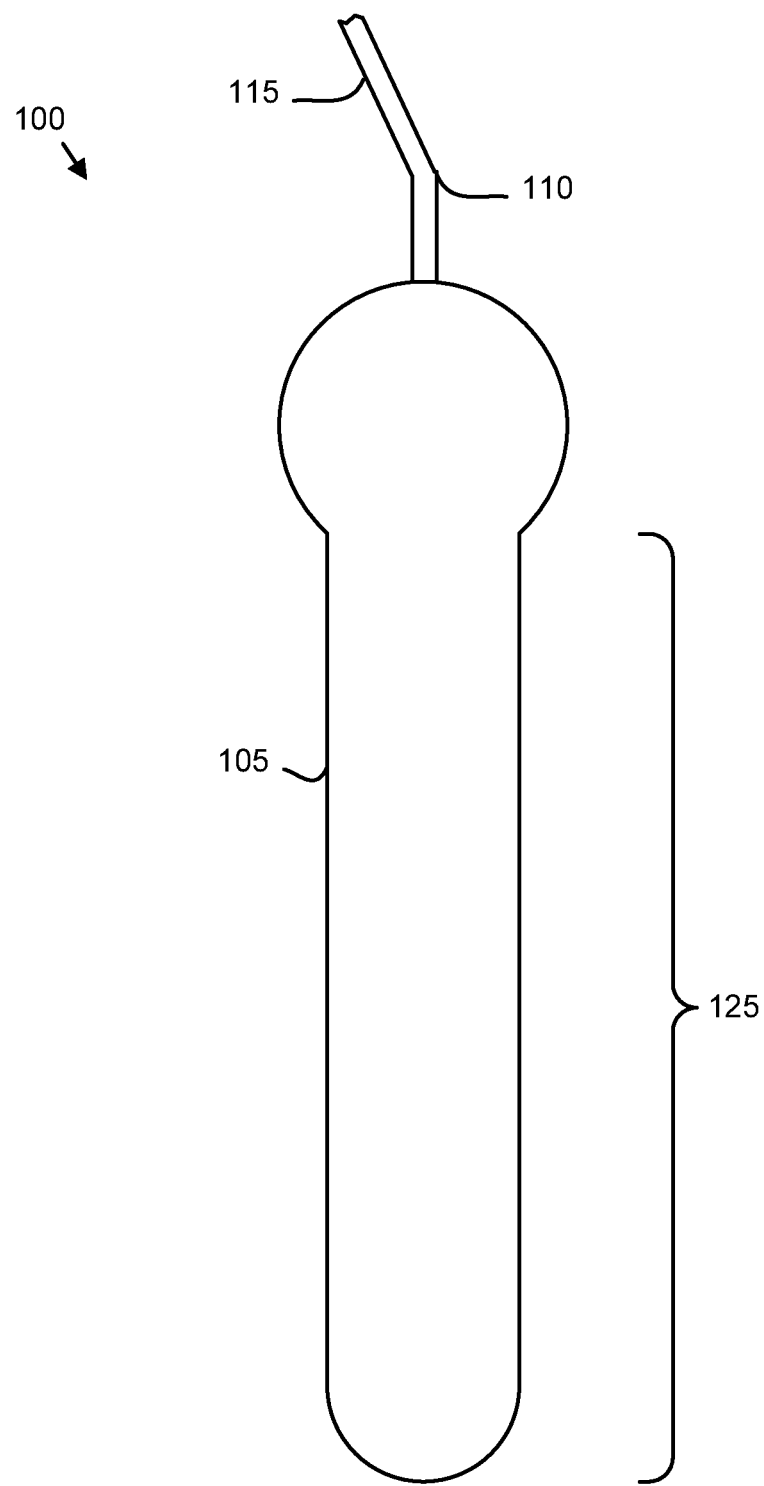
FIG. 4 is a front view drawing illustrating one alternate embodiment of a mobile camera POV mount.

FIG. 4 is a front view drawing illustrating one alternate embodiment of a mobile camera POV mount 100. In the depicted embodiment, the rotator 110 comprises a flexible shaft 110. The flexible shaft 110 bends in response to a position force that exceeds a positioning force threshold. For example, a user may apply the position force to the flexible shaft 100 and/or the stalk 115 to position the flexible shaft 110 and the stalk 115 in a desired position. The flexible shaft 110 may maintain the desired position during the motion of an activity as the moments generated on the camera and the stalk 115 by the activity do not exceed the positioning force threshold.

Figure 5:
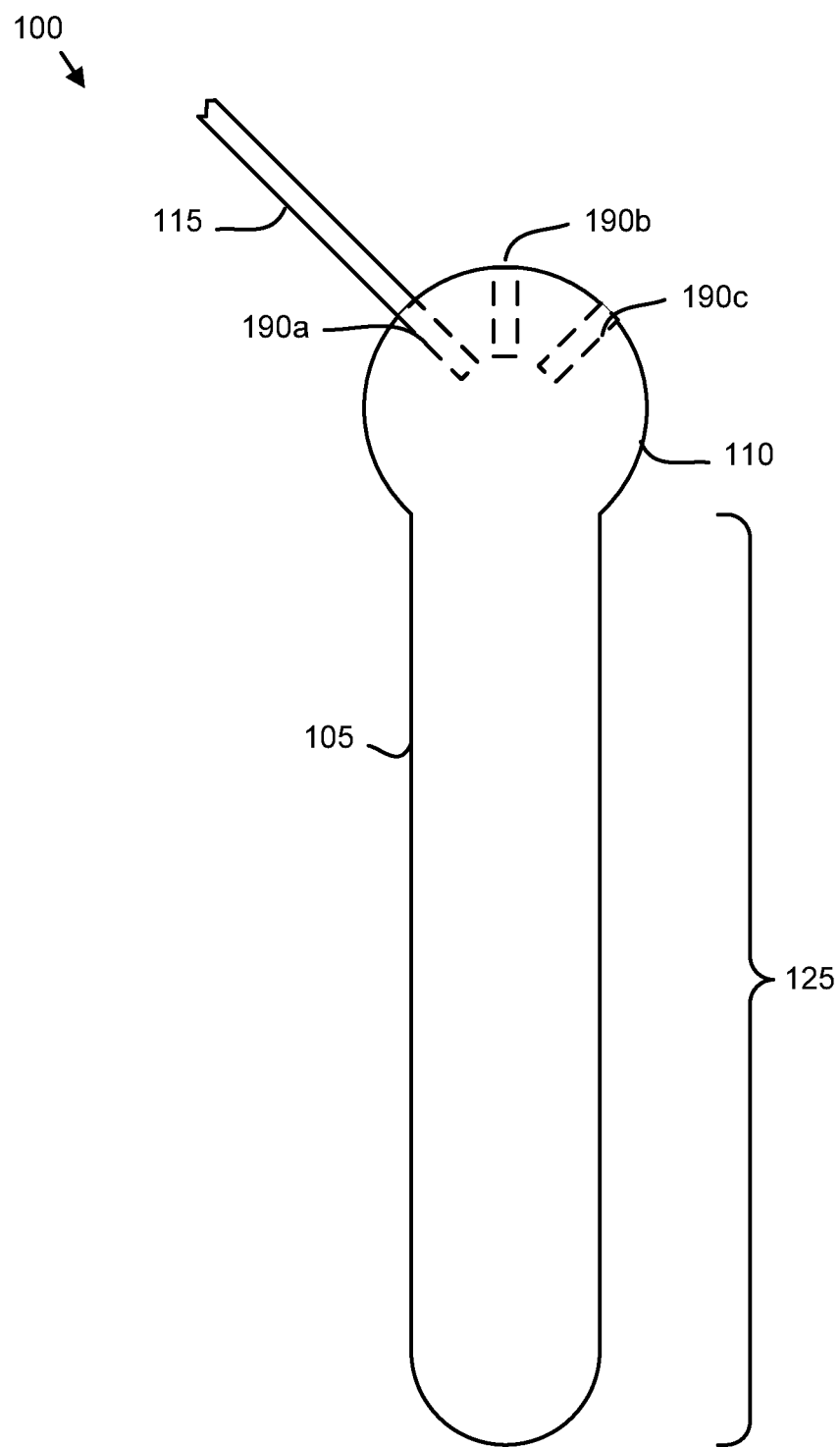
FIG. 5 is a front view drawing illustrating one alternate embodiment of a mobile camera POV mount.

FIG. 5 is a front view drawing illustrating one alternate embodiment of a mobile camera POV mount 100. The rotator 110 is depicted as having a plurality of orifices 190. The stalk 115 may be inserted in an orifice 190. The orifice 190 may hold the stalk 115 in a desired position.

Figure 6:
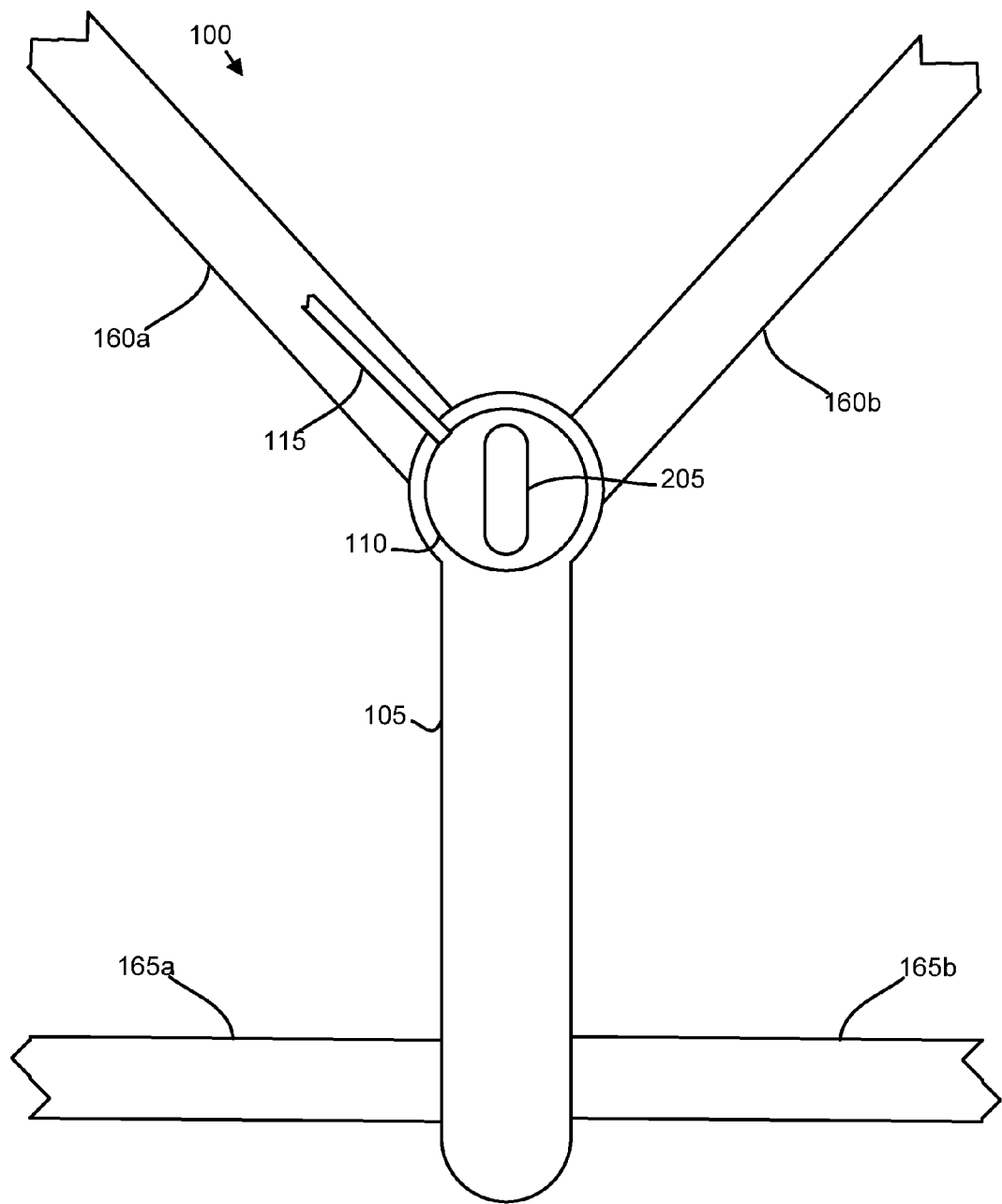
FIG. 6 is a front view drawing illustrating one alternate embodiment of a mobile camera POV mount with straps.

FIG. 6 is a front view drawing illustrating one alternate embodiment of a mobile camera POV mount 100 with straps 160, 165. The straps 160, 165 are in physical communication with the rotational stabilizer 105. In one embodiment, the straps 160, 165 secure the rotational stabilizer 105 to the user. Alternatively, the straps 160, 165 may secure the rotational stabilizer 105 to recreational equipment. In a certain embodiment, the straps 160, 165 secure the rotational stabilizer 105 to a backpack. In one embodiment, the straps 160, 165 include shoulder straps 160 and waist straps 165.

Figure 7:
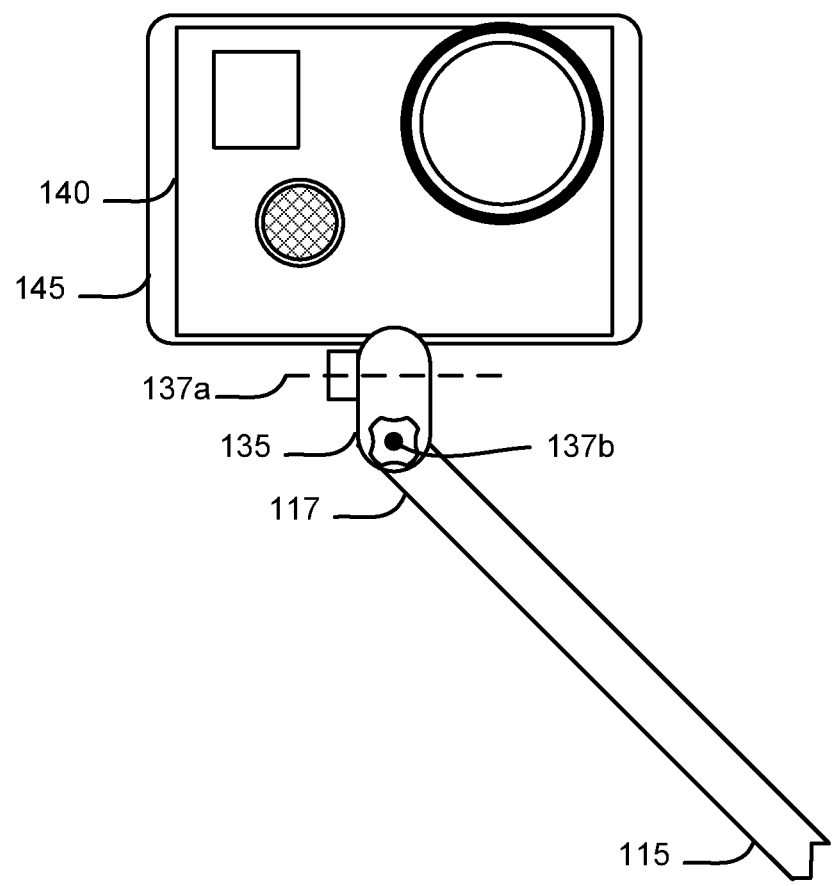
FIG. 7 is a front view drawing illustrating one embodiment of a stalk with camera connector and camera.

FIG. 7 is a front view drawing illustrating one embodiment of a stalk 115 with camera connector 135 and camera 140. The camera connector 135 may be disposed on a proximal end 117 of the stalk 115. The camera connector 135 may further be in physical communication with the camera 140. In one embodiment, the camera connector 135 is in physical communication with a camera case 145. The camera case 145 may securely hold the camera 140.

The camera connector 135 may comprise at least one pivot axis 137. In the depicted embodiment, the camera connector 135 includes two pivot axes 137a-b, with a second pivot axis 137b normal to the drawing. In one embodiment, the position of the camera 140 may be adjusted about the pivot axes 137, modifying the perspective of the camera 140.

In an alternate embodiment, the camera connector 135 may comprise a flexible shaft. The flexible shaft may be positioned to modify the perspective of the camera 140.

Figure 8:
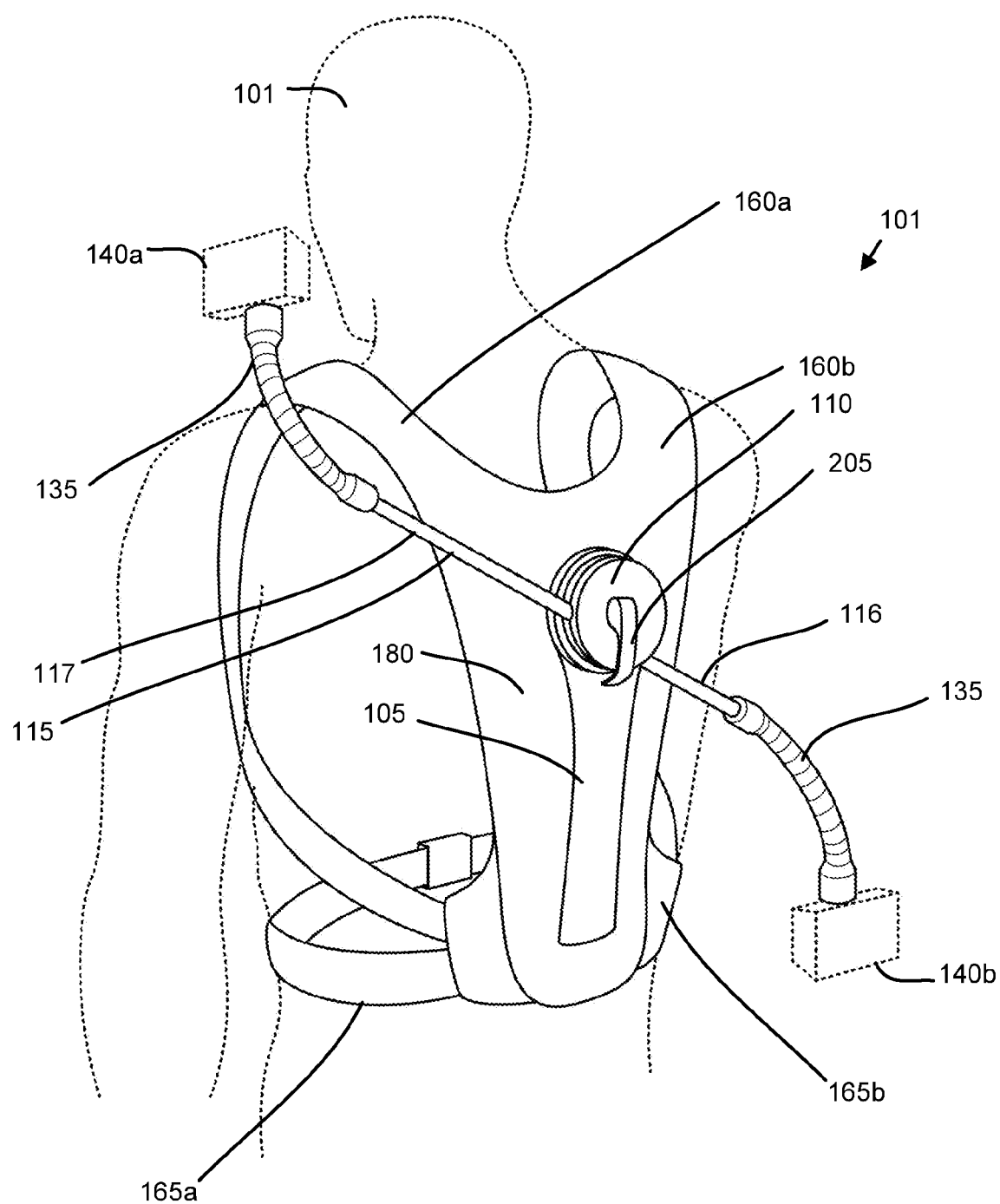
FIG. 8 is a perspective drawing illustrating one embodiment of a mobile camera POV mount worn by user.

FIG. 8 is a perspective drawing illustrating one embodiment of a mobile camera POV mount 100 worn by user 101. In the depicted embodiment, the stalk 115 includes flexible shaft camera connectors 135 on the proximal end 117 and the distal end 116 of the stalk 115.

The clamp 205 is shown in the locked position. In the locked position, the rotator 110 does not rotate the stalk 115 about a degree of freedom. The camera connectors 135 are shown further positioning cameras 142 record activity.

When the clamp 205 is in the unlocked position, the rotator 110 may rotate about the clamp 205, allowing the stalks 115 and the cameras 140 disposed on the camera connectors 135 of the stalks 115 to be positioned for another desired perspective.

In the depicted embodiment, a first camera 140a is disposed above the user's shoulder. A second camera 140b is disposed of the user side at approximately waist level. The mobile camera POV mount 100 may position the cameras 140 at a wide variety of perspectives. The user can easily change the position of the cameras 140 by moving the clamp 205 to the unlocked position and rotating the rotator 110 to reposition the stalks 115.

The rotational stabilizer 105 is disposed along the user's back, mitigating rotation about the user's back. The rotational stabilizer 105 is secured to the user by shoulder straps 160 and the waist straps 165.

Figure 9:
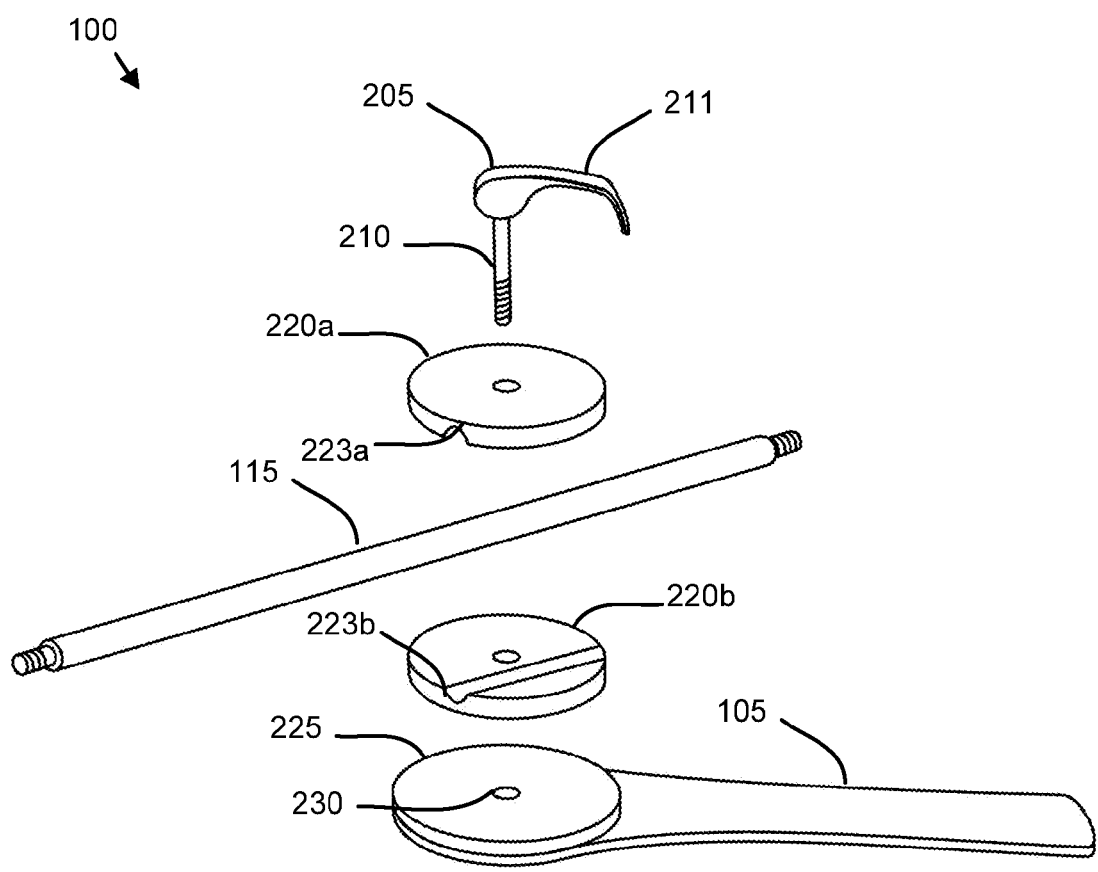
FIG. 9 is an exploded perspective drawing illustrating one embodiment of a mobile camera POV mount.

FIG. 9 is an exploded perspective drawing illustrating one embodiment of a mobile camera POV mount 100. The mobile camera POV mount 100 includes a stalk brace 220. The stalk brace 220 may include a stalk groove 223. The stalk groove 223 may hold the stalk 115.

The stalk brace 220 may hold the stalk 115. In one embodiment, the stalk brace 220 secures the stalk 115 within the stalk groove 223. A base 225 is mounted on the rotational stabilizer 105. In the depicted embodiment, the base 225 includes a threaded hole 230. The base 225 may be in physical communication with the stalk brace 220.

In the depicted embodiment, the stalk brace 220 includes a proximal stalk brace 220a and a distal stalk brace 220b. The proximal stalk brace 220a has a proximal stalk groove 223a. The distal stalk brace 220b has a distal stalk groove 223b. In one embodiment, the base 225 is in physical communication with the distal stalk brace 220b.

The clamp 205 comprises a shaft 210 that may physically connect to the rotational stabilizer 105. In the depicted embodiment, the shaft 210 includes a threaded end that is threaded into the threaded hole 230. The clamp 205, shaft 210, proximal stalk brace 220a, distal stalk brace 220b, base 225, and threaded hole 230 may be embodied in the rotator 110.

The clamp 205 may be configured with a lever 211 rotatably connected to the shaft 210. The clamp 205 may rotate about the shaft 210 to apply a force to the stalk 115 in the locked position. In one embodiment, the clamp 205 applies the force in the locked position by pressing against the rotator 110. In a certain embodiment, the clamp 205 applies the force in the locked position by pressing against the proximal stalk brace 220a.

In the unlocked position, the clamp 205 may not press against the rotator 110 and/or the proximal stalk brace 220a of the rotator 110. Alternatively, the clamp 205 may apply a minimal force against the rotator 110 and/or the proximal stalk brace 220a in the unlocked position. The clamp 205 may maintain the proximal stalk brace 220a in physical communication with the distal stalk brace 220b in the locked position and in the unlocked position.

The proximal stalk groove 223a and the distal stalk groove 223b may hold the stalk 115. With the clamp 205 in the unlocked position, the stalk 115 may be moved within the proximal stalk groove 223a and the distal stalk groove 223b. For example, a midpoint of the stalk 115 may be moved relative to the rotator 110. With the clamp 205 in the locked position, the stalk 115 may be held securely between the proximal stalk groove 223a and the distal stalk groove 223b. In addition, with the clamp 205 in the locked position, the stalk brace 220 is prevented from rotating about the at least one degree of freedom 171.

Figure 10:
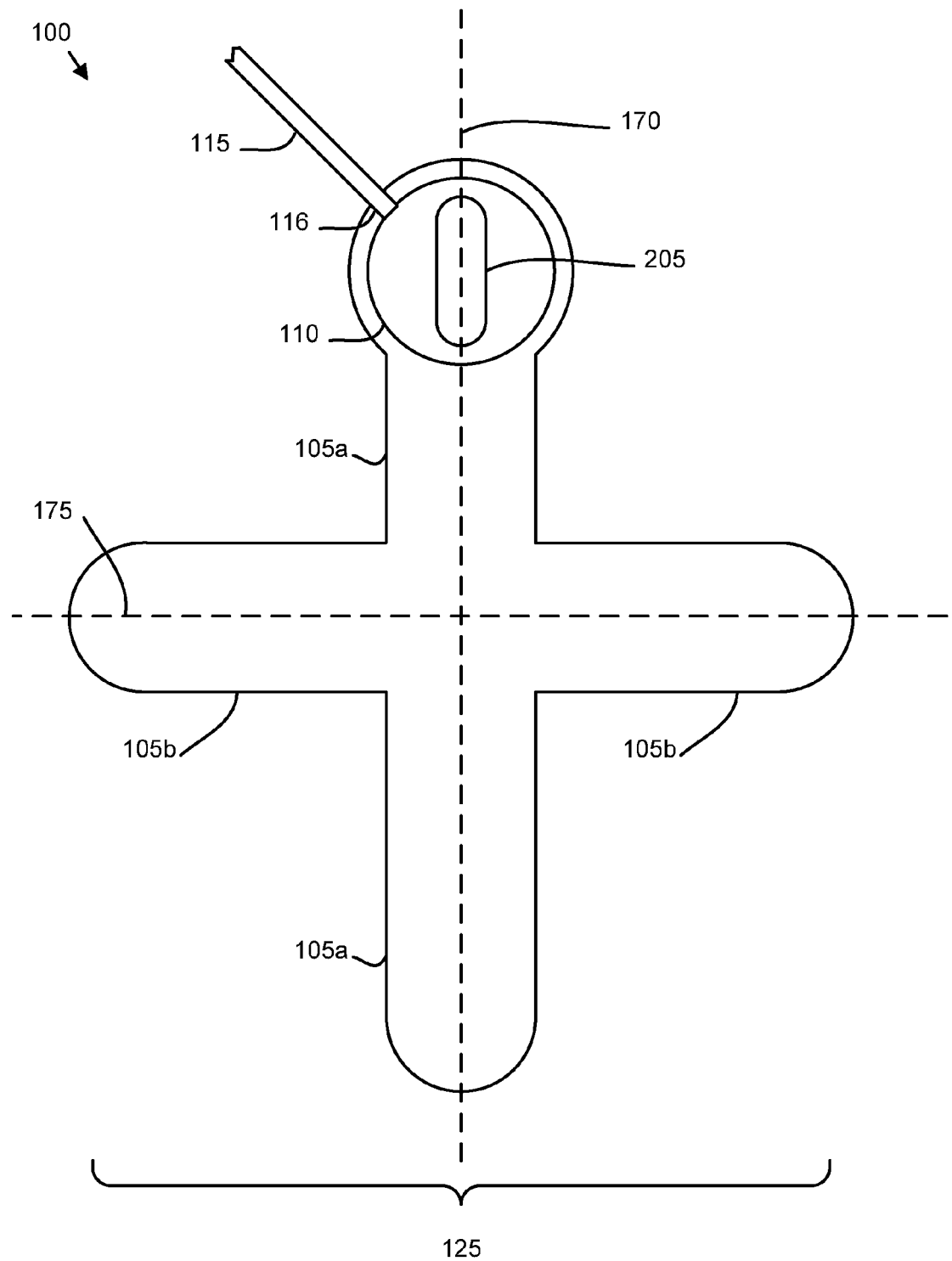
FIG. 10 is a front view drawing illustrating one alternate embodiment of a mobile camera POV mount.

FIG. 10 is a front view drawing illustrating one alternate embodiment of a mobile camera POV mount 100. In the depicted embodiment, the mobile camera POV mount 100 includes a vertical rotational stabilizer 105a and a horizontal rotational stabilizer 105b. In an alternative embodiment, the mobile camera POV mount 100 includes only a horizontal rotational stabilizer 105b. The horizontal rotational stabilizer 105b may have a length 125 in the range of 15 to 40 cm.

Figure 11:
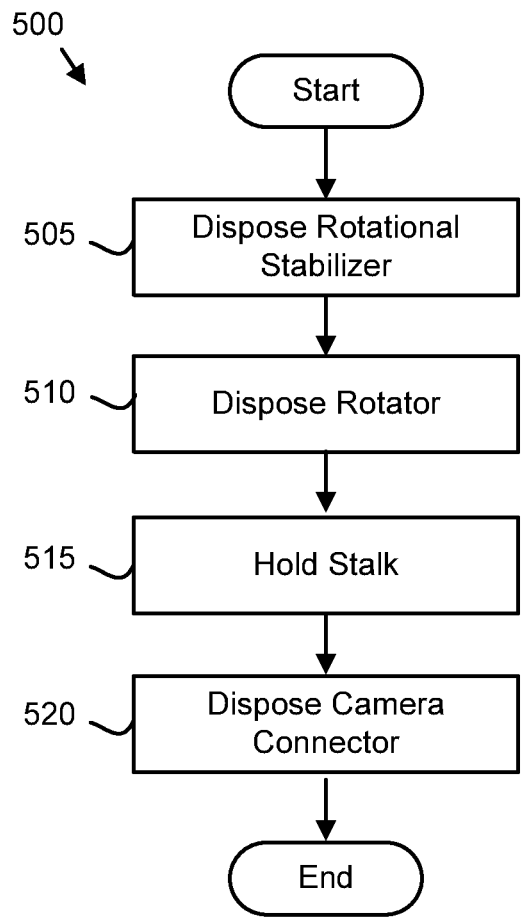
FIG. 11 is a schematic flow chart diagram illustrating one embodiment of a mobile camera POV mounting method.

FIG. 11 is a schematic flow chart diagram illustrating one embodiment of a mobile camera POV mounting method 500. The method 500 may perform the functions of the mobile camera POV mount 100.

The method 500 starts and disposes 505 a rotational stabilizer 105 in physical communication with the surface. The rotational stabilizer 105 may have a length 125 in the range of 15 to 40 cm. The method 500 further disposes the rotator 110 on the rotational stabilizer 105.

In one embodiment, the method 500 holds 515 the stalk 115 with the rotator 110 such that the stalk 115 may be rotated about at least one degree of freedom 171. The method 500 may further dispose 520 a camera connector 135 on the stalk 115 and the method 500 ends. The stalk 115 may comprise a distal end 116 held by the rotator 110 and a proximal and 117 with the camera connector 135.

The mobile camera POV mount 100 positions one or more cameras 140 on one or more stalks 115 at desired perspectives. The stalks 115 may be repositioned by unlocking the clamp 205 and allowing the rotator 110 along with the one or more stalks 115 to rotate about at least degree of freedom to a desired position. The clamp 205 may further be moved to a locked position, preventing the rotator and the one or more stalks 115 from rotating about a degree of freedom 171 and maintain the desired perspective of the cameras 140.

As the user 101 moves as part of an activity, the rotational stabilizer 105 mitigates rotation of the mobile camera POV mount 100. For example, when the mobile camera POV mount is strapped to the user 101, the rotational stabilizer 105 is in physical communication with the surface of the user, preventing the mobile camera POV mount 100 from rotating relative to the user 101. As a result, the desired perspective of cameras 140 is maintained. However, by moving the clamp 205 to the unlocked position, the stalk 115 may be quickly repositioned to position the camera connector 135 and the camera 140 at a new desired position.

As a result, the user has more options for positioning the cameras 140. The positioning and perspective the cameras 140 may be quickly modified. However, after the cameras are positioned as desired, the clamp 210 may be moved to the locked position, and desired position of the cameras 140 securely maintained.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   at least one shoulder strap that is worn by a person;
   a rotational stabilizer in physical communication with the at least one shoulder strap and having a planar surface along an entire length along a first axis with the entire length in the range of 15 to 40 centimeters;
   a rotator disposed on the rotational stabilizer and holding a stalk such that the stalk is only rotated about a third axis perpendicular to the first axis and perpendicular to the planar surface; and
   the stalk comprising a proximal end with a camera connector disposed on the proximal end.

2. The apparatus of claim 1, wherein the rotator comprises:
   a stalk brace that holds the stalk; and
   a clamp that prevents the stalk brace from rotating about the third axis in a locked position and allows the stalk brace to rotate about the third axis in an unlocked position.

3. The apparatus of claim 2, wherein the stalk brace comprises a proximal stalk brace with a proximal stalk groove and a distal stalk brace with a distal stalk groove, the proximal stalk brace disposed in physical communication with the distal stalk brace wherein the distal stalk groove is disposed opposite the proximal stalk groove, the proximal stalk groove and the distal stalk groove holding the stalk and the clamp maintaining the proximal stalk brace in physical communication with the distal stalk brace in both the locked position and the unlocked position.

4. The apparatus of claim 2, wherein the clamp applies a locking force to the stalk brace in the locked position, the force frictionally holding the stalk brace in contact with the rotator.

5. The apparatus of claim 4, wherein the clamp comprises a shaft physically connecting to the rotational stabilizer.

6. The apparatus of claim 5, wherein the clamp comprises a lever rotatably connected to the shaft and rotating about the shaft to apply the force to the stalk in the locked position.

7. The apparatus of claim 1, wherein rotator comprises
   a socket;
   a ball rotating within the socket and holding the stalk within an orifice;
   a clamp applying a force to the ball in a locked position, the force frictionally holding the ball against the socket in the locked position such that the ball does not rotate about the third axis within the socket.

8. The apparatus of claim 1, wherein the rotator comprises a flexible shaft that bends in response to a position force that exceeds a positioning force threshold.

9. The apparatus of claim 1, wherein the planar surface is in physical communication with a user.

10. The apparatus of claim 1, wherein the planar surface is in physical communication with a backpack.

11. The apparatus of claim 1, wherein the planar surface is in physical communication with clothing.

12. The apparatus of claim 1, wherein the rotational stabilizer is formed of a molded plastic.

13. The apparatus of claim 1, wherein the camera connector comprises at least one pivot axis.

14. The apparatus of claim 1, wherein the camera connector comprises a flexible shaft.

15. The apparatus of claim 1, the stalk further comprising a second camera connector.

16. A system comprising:
- at least one shoulder strip that is worn by a person;
- a rotational stabilizer in physical communication with at least one shoulder strap and having a planar surface along an entire length along a first axis with the entire length in the range of 15 to 40 centimeters;
- a rotator disposed on the rotational stabilizer and holding a stalk such that the stalk is only rotated about a third axis perpendicular to the first axis and perpendicular to the planar surface;
- the stalk comprising a proximal end with a camera connector disposed on the proximal end; and
- a camera in physical communication with the camera connector of the stalk.

17. A method comprising:
- disposing a rotational stabilizer in physical communication with at least one shoulder strap that is worn by a person, the rotational stabilizer having a planar surface along an entire length along a first axis with the entire length in the range of 15 to 40 centimeters;
- disposing a rotator on the rotational stabilizer;
- holding a stalk with the rotator such that the stalk is only rotated about a third axis perpendicular to the first axis and perpendicular to the planar surface; and
- disposing a camera connector on the stalk, the stalk comprising a proximal end with the camera connector.

* * * * *